May 3, 1938. B. P. SCHILTZ 2,116,251
WORKHOLDER FOR METAL CUTTING MACHINES
Filed Jan. 19, 1937  3 Sheets-Sheet 2
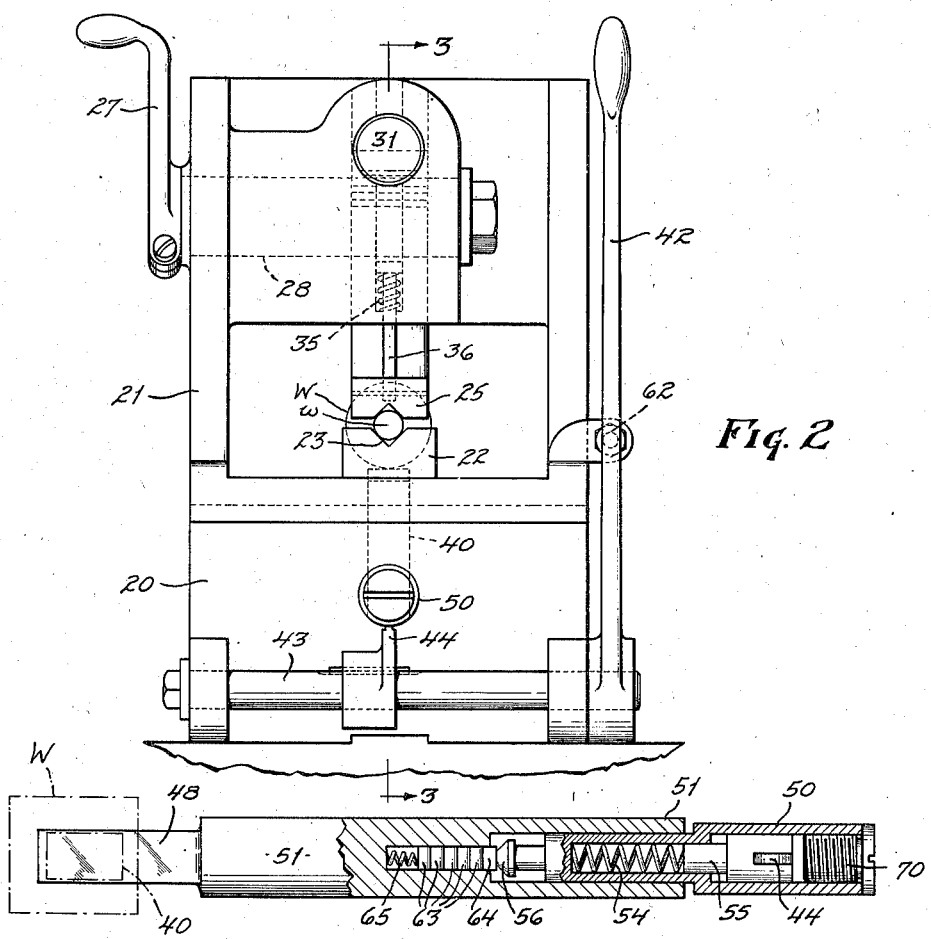
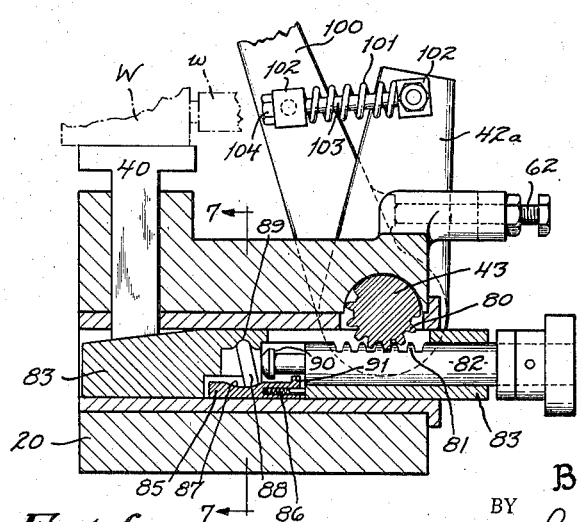
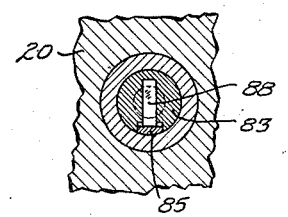
INVENTOR.
Bernard P. Schiltz
BY Bates, Golrick & Teare
ATTORNEY.

May 3, 1938.                B. P. SCHILTZ                2,116,251
              WORKHOLDER FOR METAL CUTTING MACHINES
                 Filed Jan. 19, 1937        3 Sheets-Sheet 3

INVENTOR.
Bernard P. Schiltz
BY Bates, Golrick & Pearl
ATTORNEY.

Patented May 3, 1938

2,116,251

UNITED STATES PATENT OFFICE 2,116,251

WORKHOLDER FOR METAL-CUTTING MACHINES

Bernard P. Schiltz, Cleveland, Ohio, assignor to The Foote-Burt Company, Cleveland, Ohio, a corporation of Ohio Application January 19, 1937, Serial No. 121,348

8 Claims. (Cl. 90—59)

This invention relates to an improved workholding mechanism for a metal-cutting machine, and particularly to an improved work support for supporting a workpiece adjacent the area or surface to be acted on by the cutting tool. The improved workholder is particularly adapted for that type of metal-cutting machine commonly known as a "broaching machine". Such machines generally comprise a frame having a series of tools adapted to be progressively passed over the work, either by movement of the tool past relatively stationary work or by movement of the work past relatively stationary tools.

The primary object of the present invention is to provide an improved workholder for a metal-cutting machine which will support workpieces adjacent the surfaces to be acted upon by a metal-cutting tool and in such a manner as to withstand the reactions of the cutting operation and prevent distortion of the workpiece, even though the work is clamped to the workholder at a point comparatively remote from the surface or surfaces of the work which are to be subjected to the action of the cutting tool.

A further object is to provide a workholder with a work support, which will enable comparatively fragile or resilient work to be supported to withstand the action of the cutting tool, without danger of breaking or distorting the work.

Another object of this invention is to provide a workholder having a work clamp, with a work support, which support may be brought into contact with the previously clamped work in such a manner that the pressure of the support against the work will be maintained below a predetermined maximum and at the same time will withstand the force of the cutting tool on the work, even though such force be materially greater than the pressure of the support on the work.

Other objects of the present invention will become more apparent from the following description, which refers to a preferred embodiment of my invention shown in the accompanying drawings. The essential features of the invention will be set forth in the claims.

Figure 1:
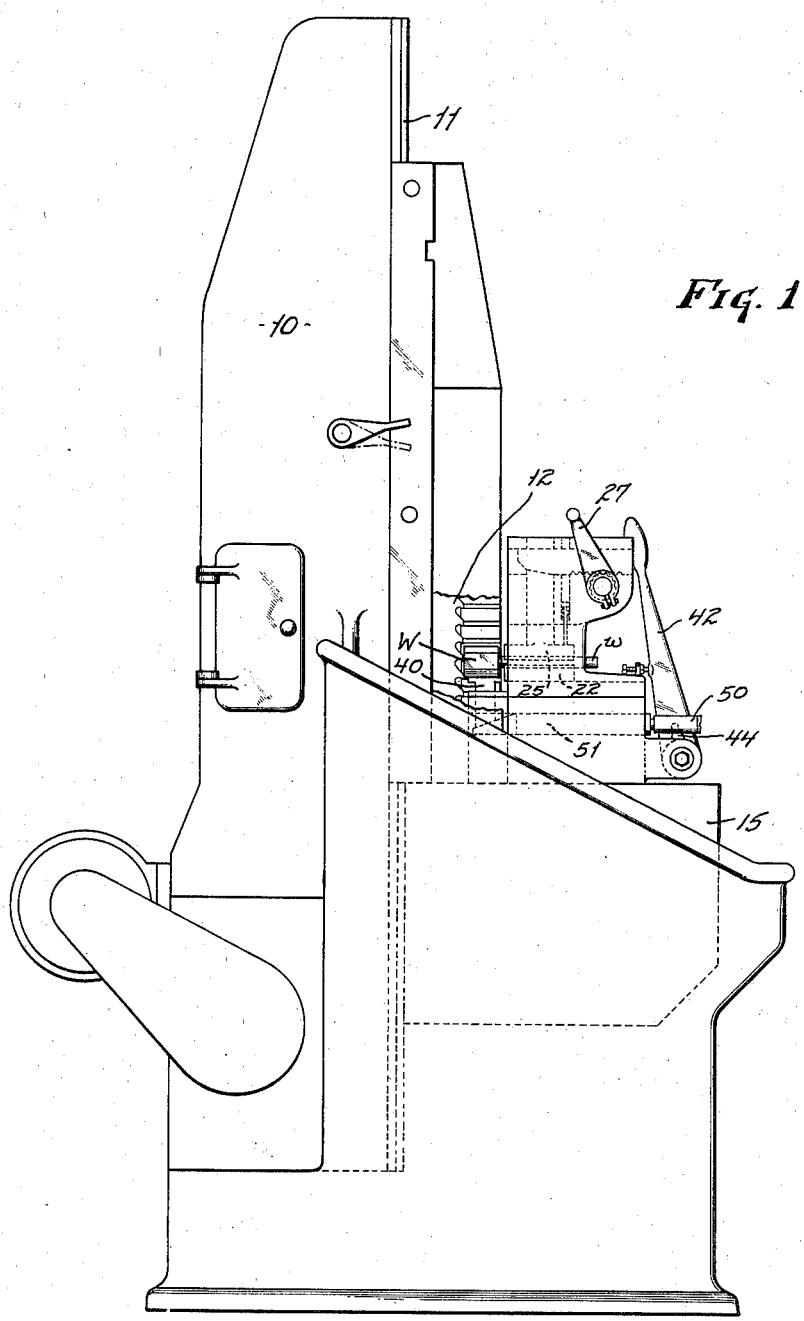
Figure 4:
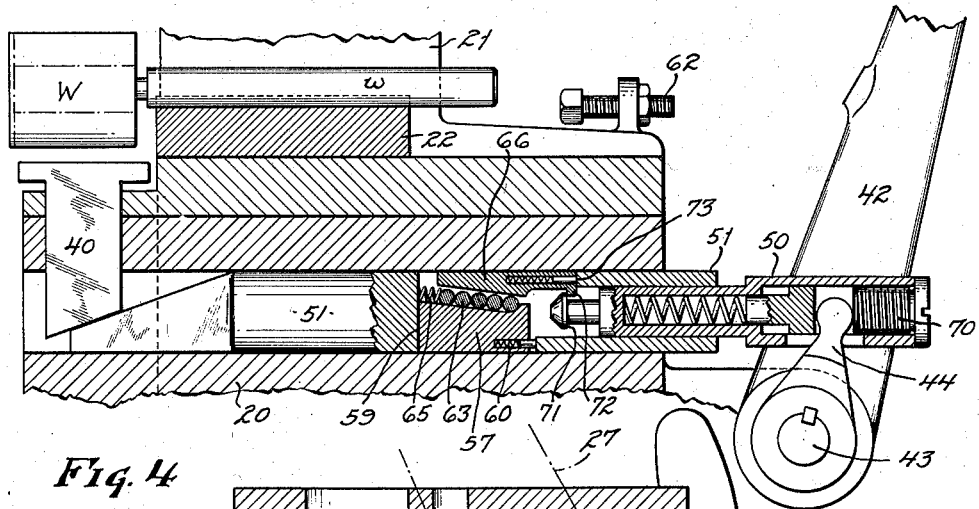
Figure 3:
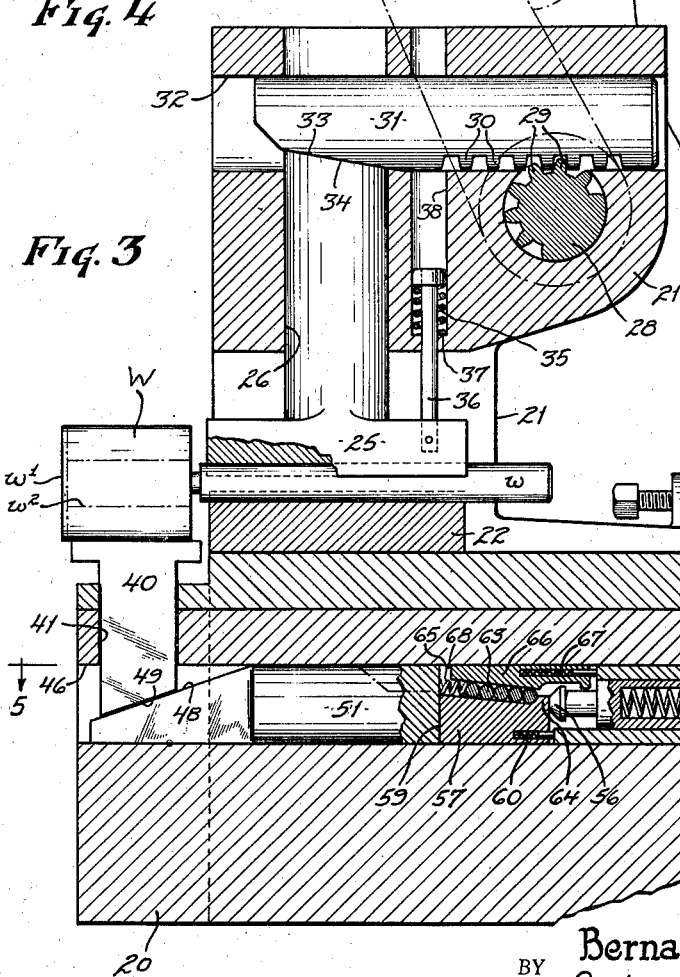

Referring now to the drawings, wherein I illustrate a preferred embodiment of my invention, Fig. 1 is a side elevation of a broaching machine, incorporating my improved workholder; Fig. 2 is a fragmentary elevation of the workholder and associated parts, looking at the right-hand side of Fig. 1, the scale being considerably larger than that of Fig. 1; Fig. 3 is an enlarged sectional detail, as indicated by the lines 3—3 of Fig. 2; Fig. 4 is a section, similar to Fig. 3, illustrating certain parts in a different position; Fig. 5 is a horizontal section, the plane of the section being indicated by the line 5—5 on Fig. 3; Fig. 6 is a sectional detail illustrating a modified form of work-clamping mechanism; Fig. 7 is a transverse section, indicated by the line 7—7 on Fig. 6.

My improved workholding and supporting mechanism, while being especially adapted for use in connection with a broaching machine, nevertheless may be advantageously used with many other types of metal-cutting machines. I have, however, chosen to illustrate the invention in connection with a broaching machine. As shown in Fig. 1, such broaching machine may comprise a frame 10, provided with a vertically extending guideway 11 on which a metal-cutting tool or broach 12 is reciprocally mounted. A motor M is connected in the usual manner to cause the broach to be alternately reciprocated in the guideway. A forwardly extending bed 15 supports the workholder 20 so that the work W will be positioned to be engaged by the tool 12, on the downward movement of the tool and moved out of contact with the tool during the upward travel thereof. Inasmuch as such broaching mechanisms are well known in the art, a more detailed description will not be given here.

My improved workholder and supporting mechanism is especially adapted for fragile articles or articles which are readily distorted. In many instances, workpieces are of such a nature, that it is preferred to clamp them in position on a workholder by engaging points of the workpiece which are remote from the surface of the workpiece acted on by the cutting tool. In these instances it has been found expedient to support or back up the work at a point comparatively close to the surface or surfaces to be acted on by the cutting tool.

In some instances, certain surfaces of a workpiece have been previously finished with a high degree of accuracy, while other surfaces, remote from the finished surfaces, remain to be finished. In these instances it is desirable to clamp the work in the workholder by gripping the previously finished surfaces, thus permitting the work to be presented to the cutting tool with a high degree of accuracy, whereby the newly finished surfaces will be precision cut, relative to the previously finished surfaces. Here again the comparative remoteness of the surface to be finished from the surfaces engaged by the workholder clamp often makes it desirable to support or back up the work adjacent the surfaces to be acted on by the cutting tool, thereby preventing distortion of the piece by the force of the cutting or broaching tool and consequent misalignment of the resulting surface with the previously finished surface. The workholder of the present invention provides such a support for the work, regardless of any inaccuracy of the rough or unfinished surface of the work with which the support contacts.

The workholder of the present invention is provided with a support which is so arranged that the pressure with which it is brought into contact with the work is limited. Nevertheless, the support is arranged and adapetd to resist the action of the broaching or metal-cutting tool on the work and prevent movement of the work, even though the pressures on the work resulting from the cutting operation are considerably greater than the pressure with which the support is brought into contact with the work.

The workholder 20, in general, comprises a body or frame 21, provided with a work support 22, having suitable clamping surfaces 23 to receive the work W, the surface w of which has been finished by a prior operation. The workholder is preferably movably mounted on the bed 15, to enable the work and workholder to be moved, as a unit, toward and away from the path of the cutting tool in the usual manner.

The work is clamped in position in the workholder by a clamping jaw 25. This jaw is mounted for reciprocation toward the center of the work in a guideway 26. The jaw 30 is operated by a lever 27. As shown in Fig. 1, the lever 27 is secured to a shaft 28, which extends transversely through the work holder frame 21. Intermediate its ends, the shaft 28 is provided with suitable gear teeth 29, which coact with rack-like teeth 30 formed on a plunger 31. This plunger is slidably mounted in a guideway 32 in the frame 21 for reciprocation in a direction normal to the clamp guideway 26. The forward end of the plunger 31 is bevelled, as indicated at 33, and arranged to coact with a similarly bevelled surface 34 formed on the upper end of the workclamp 25. Hence, consequent upon the rocking of the handle 27 in a counter-clockwise direction (Figs. 1 and 3), the plunger 31 will be moved toward the left, camming the work clamp 25 downwardly into contact with the work.

When the plunger 31 is retracted to release the work W, a spring 35 returns and retains the clamp to its uppermost position. This spring encircles a rod 36 and is interposed between an enlarged flange thereof and a shoulder 37 formed in the rod guideway 38. The lower end of the rod 36 is secured to the clamp 25, as at 39.

In the example illustrated, the surfaces w1 and w2 of the work are to be finished in accurate alignment with the previously finished surface w of the work W. The direction of travel of the broach during the cutting operation is indicated by the arrow in Fig. 3. In this instance the work is supported or backed up by a support 40, which is arranged to be moved, to position it relative to the work W, in a direction substantially opposite to the direction of the travel of the cutting tool during the active cutting operation. As shown, the support 40 is slidably mounted for vertical movement in a guideway 41 formed in the workholder frame 21.

The support 40 is moved into contact with the work W by the operation of a lever 42. As shown in Figs. 1, 2 and 3, the lever 42 is secured to a shaft 43, which extends transversely through the workholder frame 21. Intermediate its ends, the shaft 43 is provided with an arm 44, which coacts with a plunger assembly 45, hereinafter to be more fully described, but which is slidably mounted in a guideway 46, formed in the frame 21 for reciprocation in a direction normal to the guideway 41 of the support 40. The forward end of the plunger assembly comprises a rod or plunger 51, which is bevelled at an acute angle, as indicated at 48, and is arranged to coact with a similarly bevelled surface 49 formed on the lower end of the handle 42 in a counter-clockwise direction (Figs. 1 and 3), the bar 47 will be moved toward the left, camming the support 40 upward into contact with the work W.

The plunger assembly 45 is so arranged that the pressure applied to the support to bring it into contact with the work is limited to a predetermined maximum pressure. This plunger assembly comprises a pair of telescopically arranged plungers 50 and 51, which are slidably mounted in the guideway 46, heretofore described. As illustrated, the plunger 51 is provided with an axial opening 52, in which the plunger 50 is slidably mounted. The plunger 50 in turn, is provided with an axially extending opening 53 for the reception of a compression spring 54 and a pin 55, against which pin, the operating lever 44 acts when swung to bring the support into contact with the work.

Consequent upon the operation of the arm 44, the forward end 56 of the plunger 50 engages a block 57 mounted in a radially extending slot 58 formed in the plunger 51. The block 57 is retained in an abutting relationship to the forward wall 59 of the slot by a suitable spring 60. Hence, movement of the operating lever transmits pressure to the plunger 51 through the medium of the spring 54. An adjustable stop 62 carried by the workholder frame 21 limits the travel of the lever 42 and thus limits the clamping pressure to that pressure required to overcome the resistance of the spring 54.

While the contact pressure of the support with the work is limited, nevertheless the work may be urged against the support, by cutting forces great in comparison to the force of the contact pressure. As shown in Figs. 3, 4 and 5, and heretofore mentioned, the block 57 is mounted in a radially extending slot 58, formed in the plunger 51 and intersecting the axial opening 52 therein. The upper surface of this block is sloped slightly from the horizontal and carries a plurality of rollers 63, which are normally urged rearwardly and downwardly against a shoulder 64 of the block, by a spring 65. Superimposed above the rollers is a second block 66, which also has a bevelled roller-engaging surface. As the plunger assembly is moved from the position shown in Fig. 4 to the position shown in Fig. 3, a spring 67, carried by the block 63, forces such block toward the left, wedging the blocks 57 and 66 between the top and bottom walls of the guideway 46.

The force applied to the wedge assembly, to bring the support into contact with the work, acts in a direction to relieve the wedging action of the assembly. Hence, the assembly is readily moved to position the support in contact with the work. However, when pressure is transmitted from the work to the wedge assembly, by forces due to the cutting operation, any tendency for the support to move would tend to move the plunger 51 and the block 57 toward the right, (Fig. 3). Such movement would increase the wedging action between the wedge blocks 57, 66 and the walls of the guideway 46. However, the spring 65 is of sufficient strength to maintain a positive wedging relationship between the wedge blocks and the walls of the guideway. Hence, such movement of the wedge block 57, and therefore the plunger 51 and the support 40, is prevented, regardless of the strength of the force acting downward on the support 40 as a result of the action of the cutting tool on the work.

The wedge blocks 57 and 66, together with the rollers 63 and the associated guideways, in effect, form a unidirectional clutch or brake which prevents movement of the plunger assembly in a right-hand direction, unless the clutch is released by the operating lever 42, as hereinafter more fully described.

While the wedge blocks 57 and 66 are effective to resist movement of the plunger assembly when force is applied to the support 40, they are nevertheless readily released to permit retraction of the support, by the movement of the lever 42 in a clockwise direction, such movement also moves the plunger assembly, thereby permitting the retraction of the support. Clockwise movement of the operating lever rocks the arm 44 in a clockwise direction, and causes it to coact with a plug 70 rigidly secured to the plunger 50, thereby moving the plunger toward the right (Figs. 3 and 4), whereupon a shoulder 71 formed at the forward end of the plunger 50 engages a projecting lug 72 of the wedge 66, releasing the wedge engagement of the blocks 57 and 66 with the guideway 46 and bringing the block 66 into an abutting relationship with the rearward or right-hand wall 73 of the slotted opening 58 in the plunger 51. As illustrated in Fig. 4, continued movement of the operating lever then positively withdraws both plungers as a unit, thus permitting the support to drop in its guideway under the influence of gravity.

While I have described the support 40 as being retracted under the influence of gravity, I may provide a spring to retract it. Such spring may be arranged similar to the spring 35, heretofore described in connection with the work clamp 25. However, I contemplate positively withdrawing the support by providing a sliding tongue and groove connection between the plunger 51 and the support.

In Figs. 6 and 7, I have shown a modified form of plunger assembly in which the shaft 43 of the operating lever 42 is provided with teeth 80, arranged to coact with rack teeth 81 formed on the plunger 82. This plunger is reciprocably mounted in a hollow plunger 83, which coacts with the work support 40 in a manner similar to that heretofore described in connection with the plunger 51. As the lever 42 is swung in a clockwise direction (Fig. 6), the forward end of the plunger is brought into engagement with the plunger 83, causing the support 40 to be brought into contact with the work. During such movement of the plungers, a block 85 is forced forwardly by a spring 86. This block has an arcuate surface 87, which coacts with one end of a wedge 88, the other end of which engages an arcuate recess 89 in the plunger 83. The spring 86 is of sufficient strength to cause the wedge or cam 88 to bring the block 85 and plunger 83 into wedging engagement with the walls of the guideway. This arrangement likewise resists pressure applied thereto from the support 40, even though such pressure be materially greater than the pressure with which the support is moved into contact with the work.

In the modification the support is readily released by swinging the lever 42 in a counter-clockwise direction, causing a shoulder 90 of the plunger 82 to engage a lip 91 on the block 85, drawing it rearwardly and releasing the pressure of the wedge 88 on the block. The pressure of the support on the work is limited by loosely mounting a manually operable lever 100 on the shaft 44 and transmitting the operating force to the lever 42, through a spring 101, interposed between a pair of pivoted blocks 102 carried by respective levers 42 and 100. A rod 103, carried by one of the blocks 102, and slidably mounted in the other block, is provided with an enlarged head 104, which engages the block to positively release the wedging action withdrawing the plunger 83. The movement of the lever 100 is limited by an adjustable stop 106 carried by the workholder frame, thus insuring the limiting of the operating pressure to that required to overcome the force of the spring 101.

In both forms of the invention illustrated, the work is contacted by a contacting or supporting member 40 which is disposed between the plunger 51 or 83 and the workpiece. It is to be understood, however, that it is within the spirit of the present invention to eliminate the member 40 and so mount the plunger 51 and its associated parts in the workholder, that such plunger will itself serve as the work-contacting member. Likewise, it is obvious that the mechanism may be used to actually clamp the work against an abutment when fragile workpieces are to be operated upon.

From the foregoing it will be seen that I have provided an improved mechanism for backing up a workpiece for action by a cutting tool, wherein the pressure of the work-contacting member or support is maintained below a predetermined maximum, thereby preventing damage by crushing or distortion of the work, due to excessive pressure, and I have so arranged the workholder mechanism that the support, when positioned against the work, will resist the action or forces set up by the cutting operation, even though such forces are considerably greater than the maximum contact pressure between the support and the work which is permissible to avoid distortion or other damage to the work, and have so arranged the support that it may be easily retracted from contact with the work by the operator, and the maximum permissible pressure may be adjusted as desired.

I claim:

1. In a workholder, a movable work-engaging member, means to move the work-engaging member into contact with a workpiece, said means including a unidirectional clutch and a wedge arranged to be moved by a part of the clutch in a manner to cause the member to engage the work, an operating member and a resilient connection between the operating member and said clutch part to transmit the movement of said operating member to said part to cause said member to move in a work-engaging direction.

2. In a workholder, a movable work-engaging member, means to move the work-engaging member into contact with a workpiece, said means including a unidirectional clutch, an operating member, a resilient connection between the operating member and said means to transmit the movement of said operating member to said means to cause said member to move in a work-engaging direction, and a connection between said clutch and the operating member to release said clutch consequent upon the movement of the operating member in a direction to release said work-engaging member from engagement with the work.

3. In a workholder, a movable work-engaging member, a wedge arranged operatively to act on said member to move said member into contact with the work, and a unidirectional clutch arranged and adapted to prevent movement of said wedge in a direction to permit said member to disengage the work, resilient means to move said wedge in a direction to cause engagement with the work, and means to release said clutch to permit withdrawal of the work-engaging member from contact with the work.

4. In a workholder, a frame, a work-engaging member movably mounted in said frame, actuating means for said member, said means being slidably mounted in said frame, releasable means carried by said actuating means to prevent movement of said work-engaging member out of contact with said work, operating means for said actuating means having a resilient connection therewith arranged and adapted to limit the force applied to the actuating means when the operating means is moved in one direction, and a connection between said operating means and said releasable means to release said releasable means consequent upon movement of the operating means in another direction.

5. In a workholder for a metal-cutting machine, a frame having a pair of intersecting guideways, a work-engaging member slidably mounted in one of said guideways, a wedge slidably mounted in the other guideway and cooperating with said member to move it into contact with a work-piece, a second wedge carried by the first-named wedge, means acting on the second wedge to lock the first-named wedge against movement in an unclamping direction, an operating lever, means to transmit movement of the operating lever in a clamping direction to the first-named wedge, and a connection between the second-named wedge and said lever, said connection being arranged and adapted to withdraw the second-named wedge and release the first-named wedge for movement in an unclamping direction.

6. In a workholder for a metal-cutting machine, a work-engaging member slidably mounted in said workholder, a wedge slidably mounted in said workholder and arranged to cooperate with said member to move it into contact with a work-piece, a second wedge, means acting on the second wedge to lock the first-named wedge against movement in a direction to permit said member to move in a work-disengaging direction, an operating lever, resilient means to transmit movement of the operating lever to the first-named wedge in a direction to cause the work-engaging member to engage the work, a connection between the second-named wedge and said lever, said connection being arranged and adapted to withdraw the second-named wedge and release the first-named wedge for movement in a direction to permit said member to move out of contact with the work, and a connection between the two wedges whereby movement of the second-named wedge in a withdrawing direction moves the first-named wedge in a direction to permit the work-engaging member to disengage the work.

7. In a workholder, a frame, a work-engaging member movably mounted in said frame, actuating means for said member slidably mounted in said frame, expansible means carried by said actuating means to prevent movement of said work-engaging member, operating means for said actuating means having a resilient connection therewith arranged and adapted to limit the force applied to the actuating means when the operating means is moved in a work-engaging direction, said expansible means being arranged and adapted to be automatically released consequent upon movement of said operating means in a work-engaging direction, and a connection between said operating means and said expansible means to release the latter consequent upon movement of the operating means in work-disengaging direction.

8. A workholder, means to clamp the work to the workholder, a movable work support, means including a uni-directional clutch to move the support into contact with a work-piece, an operating member, and a resilient connection between the operating member and said second-named means to transmit the movement of said operating member to said second-named means to cause said support to move in a work-engaging direction, whereby the pressure of the support on the work is maintained below a predetermined maximum pressure.

BERNARD P. SCHILTZ.